United States Patent
Dumov et al.

(10) Patent No.: US 10,760,661 B2
(45) Date of Patent: Sep. 1, 2020

(54) HYDROMECHANICAL AUTOMATIC GEARBOX AND THE VEHICLE USING THE SAME

(71) Applicant: Viktor Izrailevich Dumov, Moscow (RU)

(72) Inventors: Viktor Izrailevich Dumov, Moscow (RU); Olga Vladimirovna Shakirova, Moscow (RU); Grigoriy Rafovich Shakirov, Moscow (RU)

(*) Notice: Subject to any disclaimer, the term of this patent is extended or adjusted under 35 U.S.C. 154(b) by 589 days.

(21) Appl. No.: 15/534,680

(22) PCT Filed: Sep. 1, 2015

(86) PCT No.: PCT/RU2015/000552
§ 371 (c)(1),
(2) Date: Jun. 9, 2017

(87) PCT Pub. No.: WO2016/163913
PCT Pub. Date: Oct. 13, 2016

(65) Prior Publication Data
US 2017/0343093 A1  Nov. 30, 2017

(30) Foreign Application Priority Data

Apr. 8, 2015 (RU) ................. 2015112829

(51) Int. Cl.
*F16H 47/06* (2006.01)
*B60K 17/10* (2006.01)
(Continued)

(52) U.S. Cl.
CPC ............. *F16H 47/06* (2013.01); *B60K 17/10* (2013.01); *F16H 41/22* (2013.01); *F16H 47/07* (2013.01); *F16H 57/0409* (2013.01); *F16H 61/56* (2013.01)

(58) Field of Classification Search
CPC ......... B60K 17/10; F16H 41/22; F16H 47/07; F16H 57/0409; F16H 61/56; F16H 47/06
(Continued)

(56) References Cited

U.S. PATENT DOCUMENTS 2,995,955 A  8/1961 Kelley
3,944,034 A  3/1976 Ahlen
(Continued)

FOREIGN PATENT DOCUMENTS

BY          14822 C1    10/2011
RU       2031808 C1     3/1995
(Continued)

OTHER PUBLICATIONS

V.V. Osepchugov, A.K. Frumkin "Avtomobil. Analiz konstruktsiy, elementy rascheta", "Mashinostroenie", 1989, p. 87, fig. 63 and p. 89, Moscow, Russia.
(Continued)

*Primary Examiner* — Thomas E Lazo
*Assistant Examiner* — Daniel S Collins

(57) ABSTRACT

A vehicle comprises a hydromechanical automatic gearbox, an automatic gear shift unit (12) connected to a pressure fluid feeding pump (15). The gearbox comprises an input shaft (4) extending from an engine, gearing (23) extending to each gear step, wherein the gearing (23) is mounted on the input shaft (4) and is as a central gear (2), located on the input shaft (4), meshing with gear wheels (3) of different gear steps having different diameters mounted on the input shaft (4) of a single hydraulic torque converter (5) comprising a pump (6) and a turbine (8) located accordingly on the input (4) and output (7) shafts thereof forming a flow path of pressure fluid, each of the hydraulic torque converter (5) is electronically and hydraulically linked to the gear shift unit (12) of the vehicle.

10 Claims, 8 Drawing Sheets

(51) Int. Cl.
  *F16H 47/07*   (2006.01)
  *F16H 61/56*   (2006.01)
  *F16H 41/22*   (2006.01)
  *F16H 57/04*   (2010.01)
(58) Field of Classification Search
  USPC .......................................................... 60/363
  See application file for complete search history.

(56) References Cited

U.S. PATENT DOCUMENTS

| | | | | |
|---|---|---|---|---|
| 4,012,908 | A | * | 3/1977 | Dundore ................ F16H 61/56 60/354 |
| 5,315,901 | A | | 5/1994 | Barnes |
| 5,394,694 | A | * | 3/1995 | Doumov ................ F16H 41/22 416/197 C |
| 2007/0169583 | A1 | | 7/2007 | Reis et al. |

FOREIGN PATENT DOCUMENTS

| | | |
|---|---|---|
| RU | 2585093 C1 | 5/2016 |
| SU | 903636 A | 2/1982 |
| SU | 1180609 A | 9/1985 |

OTHER PUBLICATIONS

International Search Report for PCT/RU2015/000552—the whole document.

\* cited by examiner

HYDROMECHANICAL AUTOMATIC GEARBOX AND THE VEHICLE USING THE SAME

THE FIELD OF THE INVENTION

The invention relates to hydromechanical automatic gearboxes (AGB) configured to be used in vehicles for various application (both on land and water) and to vehicles using such hydromechanical AGB.

THE BACKGROUND OF THE INVENTION

Currently hydromechanical AGB with a great number of gears (5-8 for top class motor cars, 12-14 for trucks, buses etc.) are used in modern vehicles. Such AGB provide comfort driving and low fuel consumption in a wide speed range of vehicles (Cf. В. В. Осепчугов, А. К. Фрумкин «Автомобиль. Анализ конструкции, элементы расчета», —М.: Машиностроение, 1989 г., Стр. 89).

Hydromechanical AGB for vehicles, comprising gearing, a gear reducer and a hydraulic torque converter having centrifugal wheels of a pump and a turbine and a reactor connected to a pressure fluid container via a pressure fluid feeding pump, are well known. The vehicle, comprising such type of gearbox, an electro-hydraulic gear shift unit and a pressure fluid feeding pump connected to the pressure fluid container, is also known. The torque transmission from the engine shaft to vehicle movers (in this case wheels) is performed in different drive modes when starting, moving forward and back at low speed due to the hydraulic torque converter. When driving at high speed the unit disables the hydraulic torque converter and the torque transmission from engine shaft to vehicle movers is performed with the use of many epicyclical gears and gear drives activated and deactivated automatically in a given sequence by friction clutches and friction brake bands (Cf. В. В. Осепчугов, А. К. Фрумкин «Автомобиль. Анализ конструкций, элементы расчета», —М.: Машиностроение, 1989 г., стр. 87, фиг. 63).

The known AGB are rather complex and labor-intensive due to the presence of many high-precision parts and units; they are also limited in operation life that, in turn, reduces their reliability and vehicle safety. An AGB within a motor car drives the four wheels with the same speed. The known AGBs have significant dimensions that do not allow any other variants of interaction with wheels and results in reduced vehicle maneuverability and road stability of the vehicle.

DISCLOSURE

The problem that the inventions as claimed are to solve is aimed at simplifying the construction, increasing the operation reliability as well as extending the operational life of the hydromechanical AGB of a vehicle due to providing hydrodynamic rotational speed and torque transmission throughout the whole range of the vehicle operation modes and furthermore providing reliability, road stability and maneuverability of the vehicle.

The technical result is achieved due to the fact that in the hydromechanical automatic multiple-speed gearbox comprising an input shaft extending from the engine and gearings extending from the input shaft to each gear step the gearings are made in the form of a central gear wheel located on the input shaft and engaged with different step gear wheels having different diameters; wherein each gear wheel is installed on the input shaft of at least one hydraulic torque converter with centrifugal wheels of a pump and a turbine located accordingly on its input and output shafts and providing pressure fluid circulation, as well as reactor variable blades located in the flow path, wherein each hydraulic torque converter is electronically and hydraulically linked to the gear shift unit of the vehicle, wherein the transmission ratio between the central gear and the top gear corresponds to the following ratio:

$$n_P^{max}/n_{En}^{max} \geq 0.62\sqrt[2]{N_{En}^{max}},$$

where $n_P^{max}$–maximum rotational speed of the hydraulic torque converter input shaft working at the gear step; $n_{En}^{max}$–maximum rotational speed of the engine shaft, $N_{En}^{max}$–maximum engine capacity (in kilowatts).

Furthermore, the hydraulic torque converter may have the following characteristics:
- a pump centrifugal wheel has profile blades with centerline turning at 122°-135° provided that the ratio of the centrifugal wheel outer diameter $D_{2P}$ of the pump and the inlet diameter $D_{1P}$ of its profile blades is: $D_{2P}/D_{1P}=1.4-1.9$;
- the turbine centrifugal wheel has profile blades with centerline turning at 110°-120° provided that the ratio of the centrifugal wheel outer diameter $D_{2T}$ of pump and the inlet diameter $D_{1T}$ of its profile blades is: $D_{2T}/D_{1T}=1.1-1.3$;
- the turbine centrifugal wheel is made with a bladeless conduit formed by centrifugal wheel discs of the turbine in front of its profile blades and having a diameter extension equal to the ratio: $D_{1T}/D_{2P}=1.15-1.4$ where $D_{1T}$ is the inlet diameter of the profile blades of the turbine centrifugal wheel and $D_{2P}$ is the outer diameter of the pump centrifugal wheel;
- reactor blades may be fixed in a completely open, partially open or completely closed position;
- the flow path of pressure fluid in hydraulic torque converters is connected with the air exhaust pump.

The technical result is also achieved due to the fact that the vehicle has an automatic gear shift unit connected to the feeding pump, which feeds pressure fluid from the fluid container, at least one automatic gearbox and movers; the automatic gearbox is designed as shown here above; it is connected to its output shaft and at least one mover, and movers may be wheels, propellers or tracks.

Furthermore, the vehicle is equipped with an air exhaust pump connected with air cavity in the pressure fluid container, and the air cavity is also connected to pressure fluid flow paths of each hydraulic torque converter of the automatic gearbox.

The technical solution as suggested allows creating a distinctively new technology of working out the AGB design map and torque transmission from vehicle engine to movers (wheels, propellers, tracks etc.) that allows designing vehicles of new generations with higher reliability, maneuverability and road stability.

The AGB as suggested provides the hydrodynamic torque transmission and engine rotational speed from the engine shaft to its output shaft at all the engine modes, wherein at each gear step the corresponding hydraulic torque converter is activated. Such AGB has no epicyclical gears, friction clutches or friction brake bands.

Hydraulic torque converters in the AGB are located in a circumferential banding around the central gear wheel installed on the gearbox input shaft connected to the engine shaft, altogether determining the drum type of the gearbox. The central gear wheel is engaged with gear wheels of smaller diameter and different reduction rate fixed on the input shafts of each hydraulic torque converter, which increases its rotational speed. The ratio of the hydraulic torque converter input shaft maximum speed working at the top gear $n_P^{max}$ and the maximum engine speed $N_{Ab}^{max}$ equals or exceeds $$n_p^{max}/n_{En}^{max} \geq 0.62 \sqrt[2]{N_{En}^{max}},$$

wherein $N_{Ab}^{max}$ is the maximum engine capacity (in kilowatts). It allows for increasing the rotation speed of the hydraulic torque converters input shafts that also provides optimally small volumes of the circulating circles internal cavities thus reducing the time of their being filled with fluid (about 0.3-0.4 seconds) when activating the hydraulic torque converters. Such an aspect allows for producing AGB with small diametric dimensions.

The abovementioned aspects of the pump and turbine wheels provide higher efficiency of the hydraulic torque converter, reaching about 92-93% at the transmission ratio of turbine speed $n_T$ and pump speed $n_P$ equal to $n_T/n_P$=0.95-1.0.

Equipping a vehicle with an air exhaust pump connected to an air cavity with pressure fluid connected in its turn to the AGB hydraulic torque converter circulating circle provides the rotation of the pump wheels and the turbines of the hydraulic torque converters whose gear steps are inactive at a reduced pressure and with low hydromechanical losses.

Smaller dimensions of AGB allow for using several identical gearboxes in a vehicle that enables the movers to work with different transmission speeds. Each mover may be connected to its own AGB. It is also possible to connect the movers on one side of the vehicle to one AGB and the movers on its opposite side to another AGB.

BRIEF DESCRIPTION OF THE DRAWINGS

The AGB comprises a central gear 2 located on an engine shaft 1, and shifting gear wheels 3 having different diameters depending on the needed value of increasing the rotational speed mounted around the central gear and meshing therewith. Each of the gear wheels 3 provides shifting to at least one gear step. Gear wheels 3 are located on input shafts 4 of hydraulic torque converters 5. Each hydraulic torque converter 5 (cf. FIG. 2) comprises a pump centrifugal wheel 6 mounted on the shaft 4 and a turbine centrifugal wheel 8 mounted on an output shaft 7 thereof which form a pressure fluid flow path 9 in which variable reactor blades 10 and a unit 11 for rotating thereof in predefined position are mounted. An electro-hydraulic gear shift unit 12 controls pressure fluid feeding in the flow path 9 via a channel 13. The pressure fluid is fed from a pressure fluid container 14 by pressure fluid feeding pump 15. The draining of pressure fluid from flow paths 9 to the container 14 is performed via a channel 16. The vehicle also comprises an air exhaust pump 17 connected to the engine shaft 1 and via a channel 18 connected to the air cavity of the container 14 with the help of an intake pipe thereof. The pressure fluid feeding pump 15 is activated by the engine shaft 1 or by an additional electric motor 19. An ejector pump 20 providing pumping the pressure fluid via an air-to-water heat exchanger 21 is used for cooling the pressure fluid. In the air-to-water heat exchanger, the cooling of the pressure fluid is provided by air flow from an electric blower 22 and by incident flow during vehicle movement.

Figure 1:
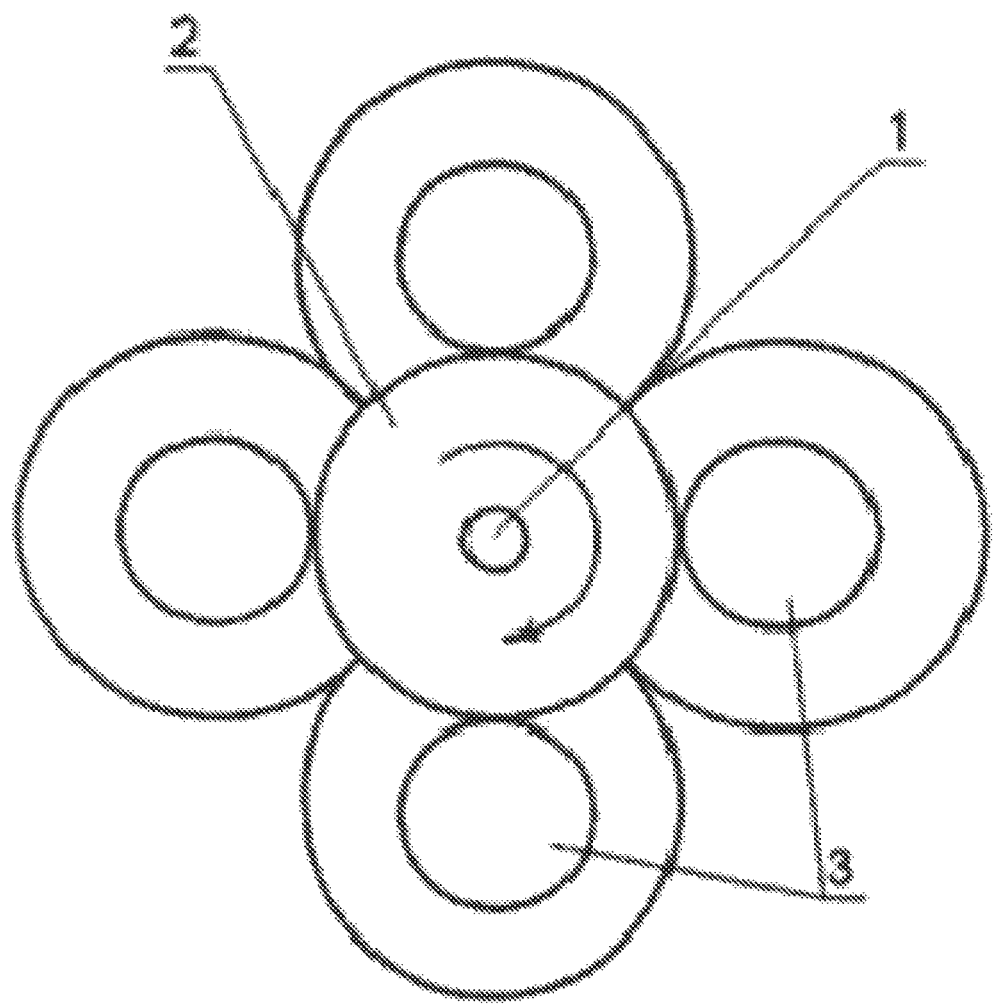
FIG. 1 is a general arrangement of gear steps in AGB.
Figure 2:
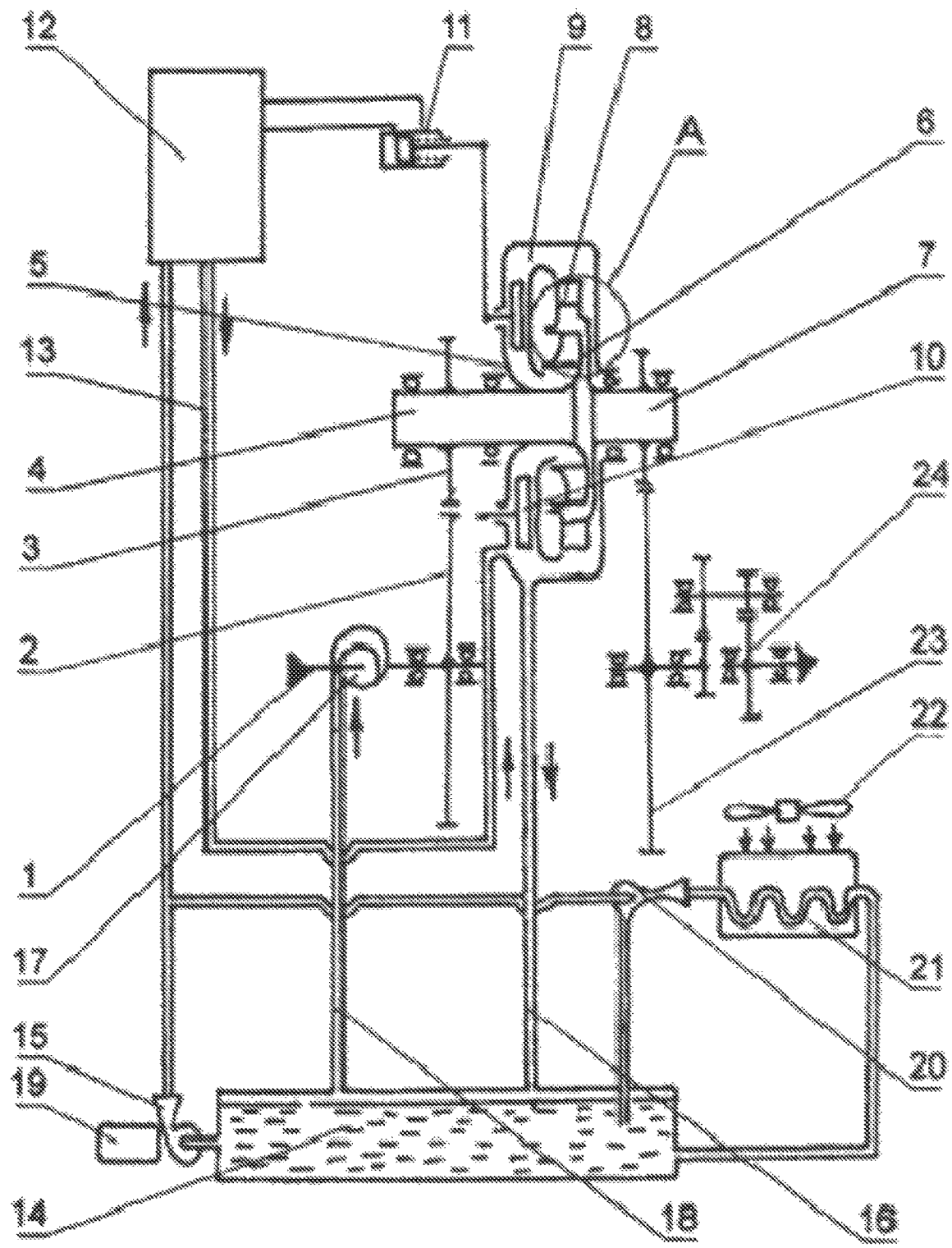
FIG. 2 is a general arrangement of AGB according to the invention.

Via gearing 23 reducing rotational speed the turbine wheel 8 is connected to gear reducer 24 unified for all hydraulic torque converters 5 which is located on the AGB output shaft and has mainly 3 or 4 flows.

Figure 3:
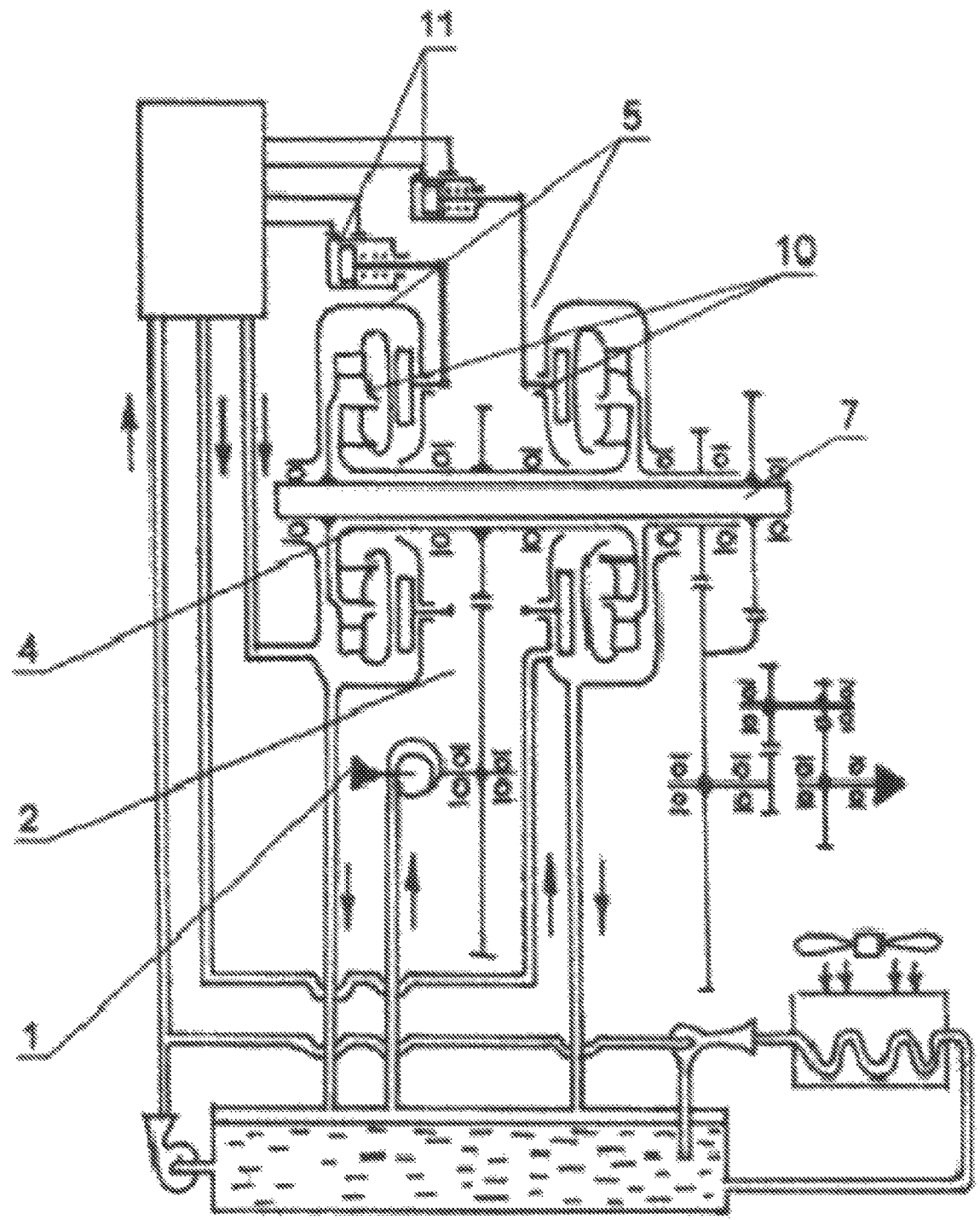
FIG. 3 is a general arrangement of AGB with additional gear steps according to the invention.

For providing AGB with increased number of gears on the single shaft 4 pump wheels 7 of two hydraulic torque converters are mounted (cf. FIG. 3). These two hydraulic torque converters allow performing modes of 4 power transmission steps.

THE PREFERRED EMBODIMENT OF THE INVENTION

The unit 11 for rotating reactor variable blades 10 in predefined fixed position may be a spring-loaded piston having working cavity connected to the pressure fluid feeding pump 15 via channels. The reactor variable blades 10 may be located in at least three fixed positions: with completely open flow area of the flow path 9 (working mode of the hydraulic torque converter 5 with maximum transmission of engine power and efficiency); with completely closed flow area of the flow path 9 (working mode of the hydraulic torque converter 5 with zero transmission of engine power and with dry internal cavity of the flow path for reducing mechanical losses during rotation of the wheels); with partially (20%) closed flow area of the flow path 9 (working mode of the hydraulic torque converter 5 with transmission of engine power of 20-25% less than maximum value and the efficiency at 85-86%). Said three fixed positions of variable blades allows performing modes of 2 steps of engine power transmission with different speed transmission ratio in AGB during operation of a single hydraulic torque converter 5.

Figure 4:
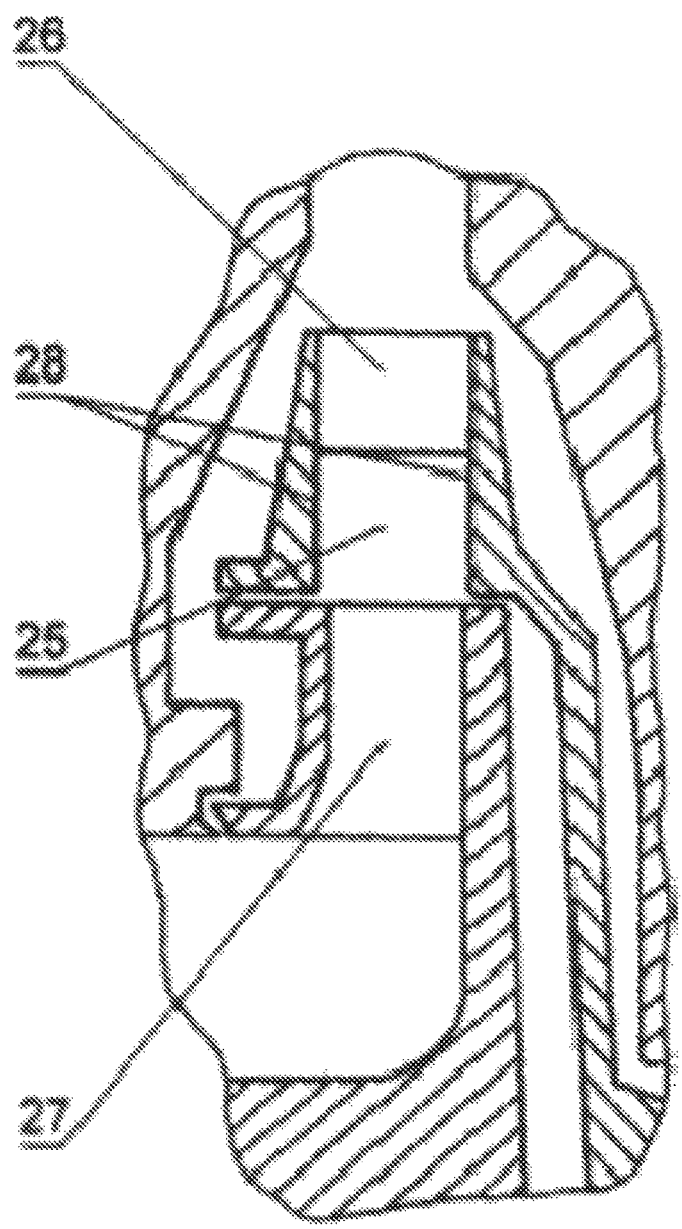
FIG. 4 is an enlarged view of the area A in FIG. 2.

A bladeless conduit 25 having a diameter extension $D_{1T}/D_{2P}$=1.15-1.4, wherein $D_{1T}$ is an inlet diameter of profile blades 26 of the turbine wheel 8, and $D_{2P}$ is an inlet diameter of profile blades 27 of the pump wheel 6 is formed in the hydraulic torque converters 5 between the blades of the pump wheel 6 and the blades of the turbine wheel 8. The conduit 25 is a bladeless slot diffusor having side limiting walls 28 rotating during operation of the hydraulic torque converter and being part of turbine wheel disks (FIG. 4). According to the law of circulation constancy, an effective decrease of flow rate circumferential components occurs in such bladeless slot diffusor causing increase of pressure in front of the turbine blades 26 and decrease of shock losses on the leading edge thereof.

Figure 5:
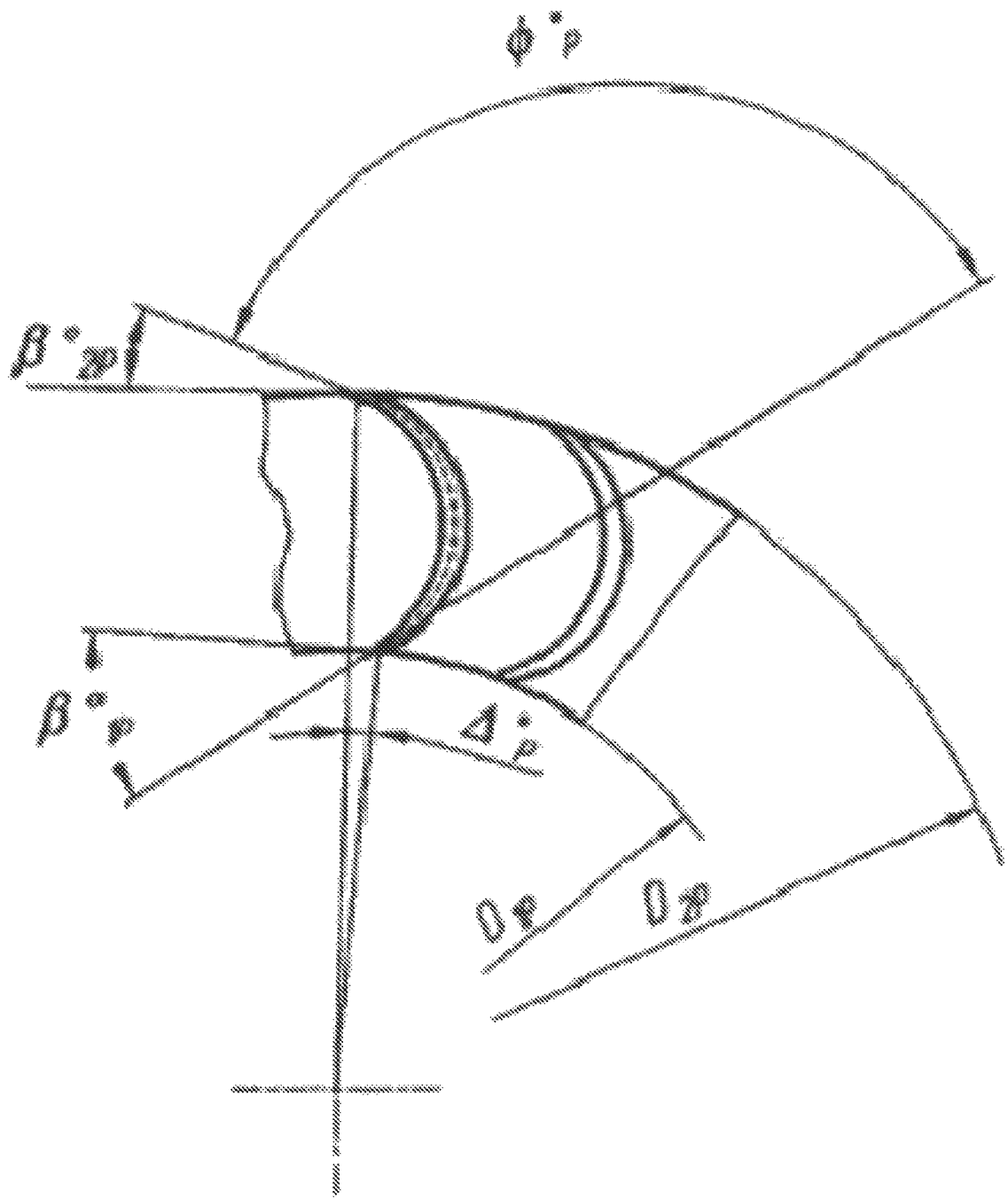
FIG. 5 is a scheme of curvature of the profile blades in the centrifugal wheel of the hydraulic torque converter pump.

The pump centrifugal wheel 6 of the hydraulic torque converter 5 is provided with the profile blades 27 having a centerline curved at the angle $\varphi°_P=180°+\Delta°_P-(\beta°_{1P}+\beta°_{2P})=122°-135°$, wherein $\Delta°_P$ is a radial angle between the leading and trailing edges of the pump wheel blades, $\beta°_{1P}$ is an angle of positioning of the profile centerline at the inlet diameter of the pump wheel, and $\beta°_{2P}$ is an angle of positioning of the profile centerline at the output diameter of the pump wheel. Whereas, the ratio between the outer diameter of the wheel and the inlet diameter of the blades is equal to: $D_{2P}/D_{2P}=1.4$-$1.9$ (FIG. 5).

Figure 6:
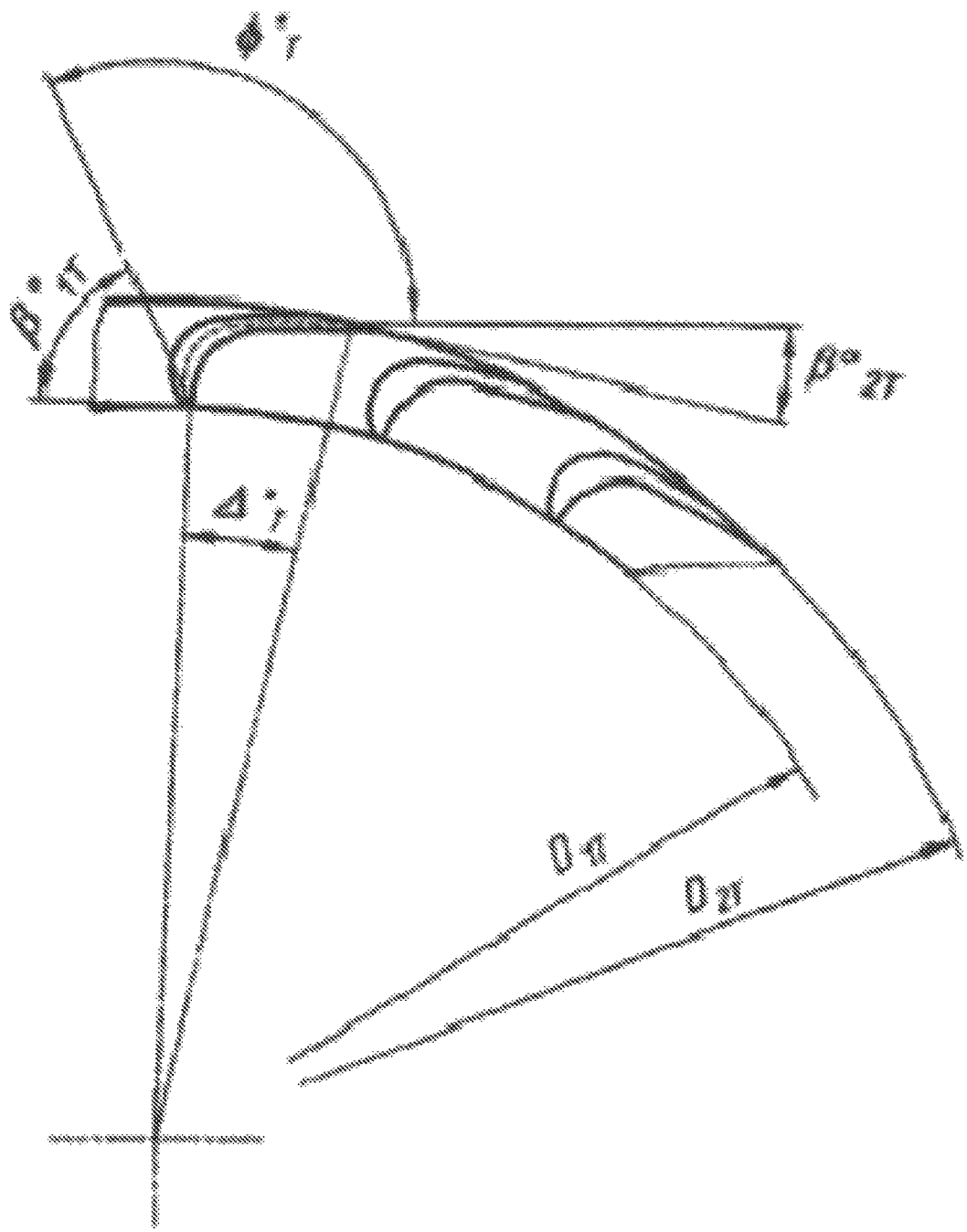
FIG. 6 is a scheme of curvature of the profile blades in the centrifugal wheel of the hydraulic torque converter turbine.

The turbine centrifugal wheel 8 is also provided with profile blades having a centerline curved at the angle $\varphi°_T=180°+\Delta°_T-(\beta°_{1T}+\beta°_{2T})=110°-120°$, wherein $\Delta°_T$ is a radial angle between the leading and trailing edges of the blades; $\beta°_{1T}$ is an angle of positioning of the profile centerline at the inlet diameter of the turbine wheel, and $\beta°_{2T}$ is an angle of positioning of the profile centerline at the output diameter of the turbine wheel. Whereas, the ratio between the outer diameter of the wheel 8 and the inlet diameter of the blades 26 thereof is equal to: $D_{2T}/D_{2T}=1.1$-$1.3$ (FIG. 6).

The abovementioned implementation aspects of the pump and turbine wheels provide exceptionally high efficiency of the hydraulic torque converter reaching 92-93% at the transmission ratio of turbine rotational speed and pump rotational speed $n_P$ equal to: $n_T/n_P=0.95$-$1.0$.

The single AGB electro-hydraulic gear shift unit 12 provides gear shifting and control of units 11 for rotating reactor variable blades 10 connected to the pressure fluid feeding pump 15 via channels and connected to internal cavities of flow paths 9 of the hydraulic torque converter 5 of each gear step via channels 13. Depending on the vehicle driving speed and the operational mode of the engine the unit 12 connects the pump 15 to the flow path 9 and the unit 11 for rotating reactor variable blades in one operating hydraulic torque converter 5 simultaneously disconnecting the feeding pump 15 from flow paths 9 of other hydraulic torque converters 5 (other gear steps) fixing the reactor blades in a closed position.

The internal cavities of flow paths 9 of all hydraulic torque converters used in the AGB are connected to the air cavity of the pressure fluid container 14 along the outer diameter thereof via channels 16 also being connected to the intake pipe of the air exhaust pump 17 for exhausting the air from the air cavity of the container 14 to the atmospheric environment driven by the engine shaft 1 or by the autonomous electric motor 19. Thereby, in the hydraulic torque converters 5 disconnected by the electro-hydraulic gear shift unit 12, the rotation of the pump and turbine wheels 6 and 8 in flow paths 9 due to exhausting the air by the pump 17 is performed at lower pressures and lesser hydromechanical losses. Such losses if necessary may be further decreased by using a free wheeling clutch providing only one-way transmission of torque moment in the gear reducer extending from the turbine shaft 7.

INDUSTRIAL APPLICABILITY

Figure 7:
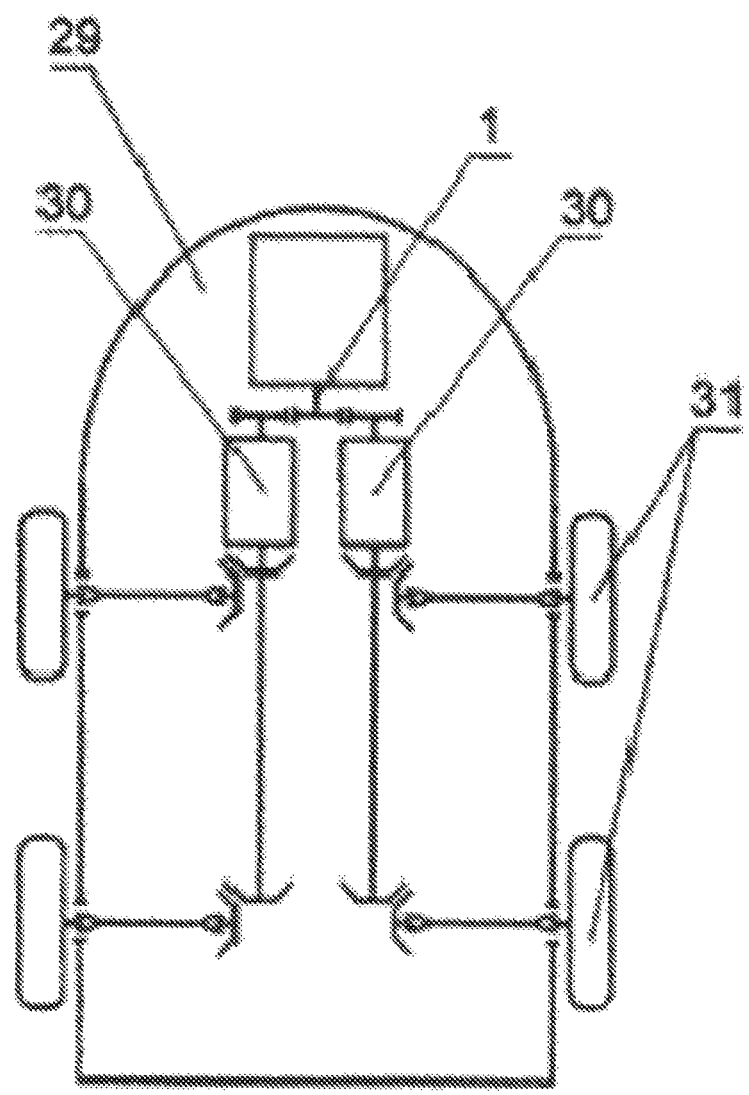
FIG. 7 is a control scheme for movers of the vehicle with several AGB (2 AGB connected with movers at one side of the vehicle).
Figure 8:
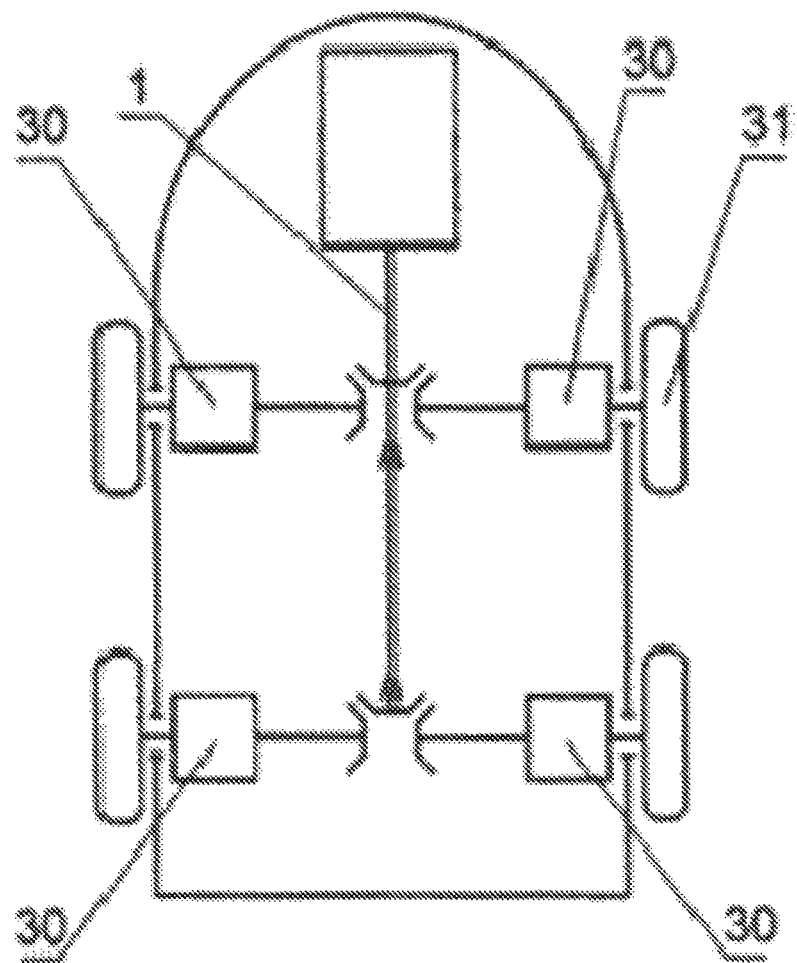
FIG. 8 is a control scheme for movers of the vehicle with several AGB (4 AGB, each of which is connected to one mover).

The implementation scheme and structure of the abovementioned type of drum automatic gearbox transmitting rotational speed and torque moment from vehicle engine has a small weight and reduced diametric and axial dimensions. It allows positioning on one vehicle 29 both one AGB 30 providing simultaneous change of speed for all movers 31 in the form of wheels, screw or tracks, and several identic AGB. For example, as shown in FIG. 7, two AGB 30 can be mounted on one vehicle, each of which is connected to movers 31 located at one side of the vehicle longitudinal axis. This allows performing maneuvers previously impossible for the particular vehicle, for example, such as a sharp turn on a dime. As shown in FIG. 8, a vehicle may have as many AGB 30, as many movers 31 it has. In this case, each ABG shifts gears for one mover. All AGB are controlled by one gear shift unit of the vehicle.

Such scheme allows using movers with different velocity ratios providing significant increasing of maneuverability and high stability of the entire vehicle. Moreover, such scheme allows activating the reverse of the wheels at a high speed, thus proving a hydraulic braking.

The aspects of the provided technical solution open up new horizons for creating vehicles of new generations.

The invention claimed is:

1. A hydromechanical automatic gearbox, comprising an input shaft extending from an engine and gearing extending from the input shaft to each gear step, wherein gearing is formed as a central gear, located on the input shaft, meshing with gear wheels of different gear steps having different diameters, each of the gear wheels is mounted on the input shaft of at least one hydraulic torque converter with centrifugal wheels of a pump and a turbine located accordingly on input and output shafts thereof forming a flow path of pressure fluid, and reactor variable blades located in the flow path, each of the hydraulic torque converters is electronically and hydraulically linked to the gear shift unit of the vehicle.

2. The automatic gearbox according to claim 1, wherein the transmission ratio between the central gear and a top gear corresponds to the following ratio:

$$n_P^{max}/n_{En}^{max} \geq 0.62 \sqrt[2]{N_{En}^{max}},$$

wherein $n_P^{max}$ is a maximum rotational speed of the hydraulic torque converter input shaft working at the gear step; $n_{En}^{max}$ is a maximum rotational speed of the engine shaft, $N_{En}^{max}$ is a maximum engine capacity (in kilowatts).

3. The automatic gearbox according to claim 1 or 2, wherein step-down gears connected to a gear reducer are located on the output shafts of the hydraulic torque converters, said gear reducer being common for all hydraulic torque converters and mounted on the gearbox output shaft.

4. The automatic gearbox according to claim 3, wherein the pump centrifugal wheel in hydraulic torque converters comprises profile blades where the centerline of the profile thereof is curved at $122°$-$135°$, and the ratio between the value $D_{2P}$ of the outer diameter of the pump centrifugal wheel, and the value $D_{1P}$ of the inlet diameter of the profile blades thereof is: $D_{2P}/D_{1P}=1.4$-$1.9$.

5. The automatic gearbox according to claim 4, wherein the turbine centrifugal wheel in hydraulic torque converters comprises profile blades where the centerline of the profile thereof is curved at $110°$-$120°$, and the ratio between the value $D_{2T}$ of the outer diameter of the turbine, and the value $D_{1T}$ of the inlet diameter of the profile blades thereof is: $D_{2T}/D_{1T}=1.1$-$1.3$.

6. The automatic gearbox according to claim 3, wherein the turbine centrifugal wheel in hydraulic torque converters is made with a bladeless conduit formed by centrifugal wheel discs of the turbine in front of profile blades thereof and having a diameter extension equal to the ratio: $D_{1T}/D_{2P}=1.15$-$1.4$, wherein $D_{1T}$ is a value of the inlet diameter of profile blades of the turbine centrifugal wheel, and $D_{2P}$ is a value of the outer diameter of the pump centrifugal wheel.

7. The automatic gearbox according to claim 3, wherein reactor blades in hydraulic torque converters are configured to be fixed in a completely open, partially open or completely closed position.

8. The automatic gearbox according to claim 3, wherein the flow path of pressure fluid in hydraulic torque converters is connected to an air exhaust pump of the vehicle.

9. A vehicle, comprising at least one automatic gearbox according to claim 1, a feeding pump, movers and an automatic gear shift unit connected to the feeding pump which feeds fluid from a fluid container, wherein the output shaft of east of said at least one automatic gearbox is connected to at least one of the movers, said movers being wheels, propellers or tracks.

10. The vehicle according to claim 9, wherein it comprises the air exhaust pump connected with the air cavity in the pressure fluid container, and the air cavity is also connected to the flow path of pressure fluid of each hydraulic torque converter of the automatic gearbox.

\* \* \* \* \*